United States Patent

Kuesters et al.

(10) Patent No.: US 9,187,574 B2
(45) Date of Patent: Nov. 17, 2015

(54) MICROPROCESSING FOR PREPARING A POLYCONDENSATE

(75) Inventors: Christof Franz Kuesters, Krefeld (DE); Bruno Frederic Stengel, Auderghem (DE); Walther Benzinger, Harthausen (DE); Jurgen J. Brandner, Sandhausen (DE)

(73) Assignee: CARGILL, INCORPORATED, Wayzata, MN (US)

( * ) Notice: Subject to any disclaimer, the term of this patent is extended or adjusted under 35 U.S.C. 154(b) by 50 days.

(21) Appl. No.: 13/575,445

(22) PCT Filed: Jan. 19, 2011

(86) PCT No.: PCT/EP2011/000193
§ 371 (c)(1),
(2), (4) Date: Jul. 26, 2012

(87) PCT Pub. No.: WO2011/091962
PCT Pub. Date: Aug. 4, 2011

(65) Prior Publication Data
US 2012/0309956 A1 Dec. 6, 2012

(30) Foreign Application Priority Data

Jan. 28, 2010 (EP) .................................... 10000850
Sep. 28, 2010 (EP) .................................... 10010973

(51) Int. Cl.
*C08B 37/00* (2006.01)
*B01J 19/00* (2006.01)
*B01J 19/24* (2006.01)

(52) U.S. Cl.
CPC ......... *C08B 37/0009* (2013.01); *B01J 19/0093* (2013.01); *B01J 2219/00873* (2013.01); *B01J 2219/00882* (2013.01); *B01J 2219/00889* (2013.01)

(58) Field of Classification Search
CPC ........................... C08B 37/00; C08B 37/0009
See application file for complete search history.

(56) References Cited

U.S. PATENT DOCUMENTS

| 3,766,165 | A | 10/1973 | Rennhard et al. |
| 5,051,500 | A | 9/1991 | Elmore |
| 2006/0199945 | A1 | 9/2006 | Gjerde |
| 2008/0108122 | A1* | 5/2008 | Paul et al. ..................... 435/183 |

FOREIGN PATENT DOCUMENTS

EP 1866066 12/2007

OTHER PUBLICATIONS

Tetrahedron, Elsevier Science Publishers, NL "Micro reactors: Principles and Applications in Organic Synthesis", V58, No. 24, Jun. 10, 2002, pp. 4735-4757 ISBN: 0040-4020.

* cited by examiner

*Primary Examiner* — Jonathan S Lau

(57) ABSTRACT

The present invention relates to a process for preparing polydextrose by using a microdevice. It further relates to the use of a microdevice for the polycondensation reactions.

17 Claims, No Drawings

MICROPROCESSING FOR PREPARING A POLYCONDENSATE

CROSS-REFERENCE TO RELATED APPLICATIONS

This application claims benefit of international application PCT/EP11/000193, filed Jan. 19, 2011, which application claims priority to European Application 10000850.7, filed Jan. 28, 2010, and European Application 10010973.5, filed Sep. 28, 2010, which applications are hereby incorporated by reference herein in their entirety.

FIELD OF THE INVENTION

The present invention relates to a process for preparing polydextrose, by using microdevices.

BACKGROUND OF THE INVENTION

In order to continually improve physical standards of living for greater number of people, it is necessary to achieve more results with fewer resources. Therefore there is the tendency towards building and manufacturing smaller-scale products due to the desire for size efficiency. Most recently, scientists have learned that not only electronic devices, but also mechanical devices, may be miniaturized and batch-fabricated, promising the same benefits to the mechanical world as integrated circuit technology has given to the electronic world.

Acid-catalysed polymerisation of saccharides is a well-known phenomenon which is described in numerous general articles, books and patents.

Polydextrose is commercially available and all of these polydextrose products include a variety of residual compounds such as glucose, sorbitol, citric acid and other compounds which contribute to the taste, colour, and caloric value. Low molecular weight compounds such as 1,6-anhydroglucose and 5-hydroxymethylfurfural contribute a bitter taste and off-flavour.

U.S. Pat. No. 3,766,165 discloses that polymers useful as low-calorie food ingredients can be prepared by heating dextrose or maltose, optionally with a minor amount of a polyol, in the presence of edible polycarboxylic acid catalysts under reduced pressure. U.S. Pat. No. 3,876,794 discloses various kinds of foods containing same.

In the wake of this important disclosure, further development and research is concentrated on overcoming the sour and/or bitter taste observed in the products according to U.S. Pat. No. 3,766,165 and U.S. Pat. No. 3,876,794.

E.g., WO 98/41545 discloses methods for preparing polysaccharides by reacting glucose or glucose containing materials with a polyol in the presence of mineral acids such as phosphoric, hydrochloric and/or sulphuric acid. According to this disclosure, the low levels of catalyst as suggested therein lead to minimal or no off-flavors and little color formed during the course of the reaction. The methods disclosed in this document may comprise further purification methods.

U.S. Pat. No. 5,831,082 describes a process for obtaining highly pure water-soluble polydextrose by separation. The water-soluble polydextrose contains considerable amounts of di-, tri- and tetrasaccharides. The products according to this disclosure are reported to not have a bitter aftertaste.

U.S. Pat. No. 5,051,500 describes a continuous method for preparing a randomly-bonded polysaccharide.

In general, the benefits of miniaturized systems have been recognized but there is still a need for further developing the use of these systems in reactions for preparing polycondensates, such as polydextrose.

SUMMARY OF THE INVENTION

The current invention relates to a process for preparing polydextrose and said process is comprising the following steps:
  a) Taking glucose,
  b) Adding an acidifying catalyst for preparing an acidic composition
  c) Injecting the composition through a microdevice
  d) Collecting the polydextrose The current invention relates to a process for preparing polydextrose and said process is comprising the following steps:
  a) Taking glucose
  b) Adding an acidifying catalyst for preparing an acidic composition, potentially in a microdevice
  c) Injecting the composition through a microdevice
  d) Collecting the polydextrose, and
    Characterized in that the microdevice is containing micro mixers, micro heat exchangers and/or micro reactors suitable for the polycondensation of carbohydrates.

The current invention further relates to an arrangement of microdevices allowing a single-pass-through of the composition of step c), a re-mix of the polydextrose of step d) with composition of step c) for a multi-pass-through or a complete multi-pass-through for the composition.

The current invention further relates to the use of microdevice for polycondensation of glucose.

DETAILED DESCRIPTION

The current invention relates to a process for preparing polydextrose and said process is comprising the following steps:
  a. Taking glucose
  b. Adding an acidifying catalyst for preparing an acidic composition
  c. Injecting the composition through a microdevice
  d. Collecting the polydextrose The current invention relates to a process for preparing polydextrose and said process is comprising the following steps:
  a) Taking glucose
  b) Adding an acidifying catalyst for preparing an acidic composition, potentially in a microdevice
  c) Injecting the composition through a microdevice
  d) Collecting the polydextrose, and
    Characterized in that the microdevice is containing micro mixers, micro heat exchangers and/or micro reactors suitable for the polycondensation of carbohydrates Glucose is provided in solid form or liquid form, whereby the solid form is either a solidified form or a crystalline form. Further suitable sources of glucose are glucose syrups containing from 50% to 100% (by weight), preferably 90% up to 99% of glucose. The remaining components in the glucose syrup are residual oligomers such as maltose, maltotriose and higher glucose polymers.

Polydextrose as referred to herein, is a water-soluble, low caloric, non-cariogenic bulking agent. It is a randomly cross-linked (branched) glucan polymer (polysaccharide complex) characterised by having predominantly β-1-6 and β-1-4 linkage and which is produced through acid-catalysed condensation of saccharides alone, (=glucose) or in the presence of sugar alcohols (=polyols).

A large range of acidifying catalysts could be used for catalysing the polymerisation to obtain polydextrose. Preferably, these catalysts are acids which are allowable for consumption in order to reduce the otherwise necessary controls and costs to check for the presence of and, if necessary, remove the catalyst acids from the final product. In particular, the preferred acids are edible acids (food grade acids) such as phosphoric acid, citric acid, malic acid, succinic acid, adipic acid, gluconic acid, tartaric acid, fumaric acid and mixtures of two or more thereof. Particularly preferred are citric acid and/or phosphoric acid. The amount of acid to be used as catalyst should be below 15 weight % relative to the amount of glucose (and polyol, if present) starting material used in the polymerisation reaction. Preferably, this amount should be clearly below this level, such as e.g. at most 12 weight %, more preferably at most 10 weight %, but not below 0.001% by weight.

The addition of the acid can be done in any vessel but might occur in the microdevice as well. Before injecting the carbohydrate containing mixture through the microdevice, the mixture can be heated by using a micro-heat-exchanger and/or microwaves or any other suitable heating device.

Microdevices are usually defined as miniaturized reaction vessels fabricated at least partially, by methods of microtechnology and precision engineering. The characteristics dimensions of the internal structure of microreactor fluid channels can vary substantially, but typically range from the sub-micrometer to the sub-millimeter range. Microreactors most often, but not necessarily, are designed with microchannel architecture. These structures contain a large number of channels and each microchannel is used to convert a small amount of material. Free microstructure shapes, not forming dedicated channels, are also possible.

The benefits of miniaturized systems, designed with dimensions similar to microreactors (microdevices), compared to a large scale process include but are not limited to that a large scale batch process can be replaced by a continuous flow process, smaller devices need less space, fewer materials less energy and often shorter response times and system performance is enhanced by decreasing the component size, which allows integration of a multitude of small functional elements. Consequently, microreactors (microdevices) significantly intensify heat transfer, mass transport, and diffusional flux per unit volume or unit area.

Typical thickness of the fluid layer in a microreactor can be set to few tens of micrometers (typically from about 10 to about 500 μm) in which diffusion plays a major role in the mass/heat transfer process. Due to a short diffusional distance, the time for a reactant molecule to diffuse through the interface to react with other molecular species is reduced to milliseconds and in some cases to nanoseconds. Therefore the conversion rate is significantly enhanced and the chemical reaction process appears to be more efficient.

The micro mixer is a static or kinetic micro mixer, a diffusion micro mixer, a cyclone-type micro mixer, a multi-lamination micro mixer, a focus micro mixer or a split-and-recombine micro mixer.

A static micro mixer is any type of micro mixer in which the mixing of two or more fluids is performed by diffusion and optionally enhanced by transfer from laminar flow regime into transitional or turbulent flow regime such as described in EP 0 857 080.

A kinetic micromixer is a micro mixer in which specially designed inlays produce a mixing by artificially eddies, or in which the mixing of two or more fluids is enhanced by applying kinetic energy to the fluids (e.g. stirring, high pressure, pressure pulses, high flow velocity, nozzle release).

A diffusion micro mixer is a mixer of the static type, in which the fluids are ducted in that way, that the distance between the single fluids is in the range of the diffusion coefficients at the process parameters. In most cases, diffusion micro mixers are taking advantage of multi-lamination of fluids such as described in EP 1 674 152, EP 1 674 150 and EP 1 187 671.

A cyclone-type micro mixer is a micro mixer based on the rotational mixing of two or more fluids, which are inserted in a asymptotic or non-asymptotic way into a mixing chamber, providing rotational speed of each fluid flow which is also disclosed in EP 1 674 152.

A multi-lamination micro mixer is a microstructure device where the single fluid streams are ducted very close to each other in lamination sheets or streams, to reduce the diffusion distance as it is disclosed in EP 1 674 152, EP 1 674 150, and EP 1 187 671.

A focus micro mixer is a kinetic mixer in which fluid streams are focused into a dense meeting point to be mixed by kinetic energy and turbulence.

A split-and-recombine micro mixer is a micro mixer where single fluid streams are split up by mechanical or non-tactile forces (e.g. electrical fields, magnetic fields, gas flow), changed in direction and position and recombined by, at least, doubling the number of sub-streams to increase the diffusion area.

The micro heat exchanger is a cross flow micro heat exchanger, counter-current flow micro heat exchanger, co-current flow micro heat exchanger or an electrically powered parallel flow micro heat exchanger and/or micro reactors suitable for the polycondensation of glucose.

A cross flow micro heat exchanger is a miniaturized plate heat exchanger in which the single fluid streams are ducted in a crosswise matter as is disclosed in EP 1 046 867.

A counter-current flow micro heat exchanger is a miniaturized plate heat exchanger in which the single fluid streams are ducted in a way that the inlets as well as the outlets of both fluids are in opposite direction to each other and therefore the fluid streams are running against each other, which is also described in EP 1 046 867.

A co-current flow micro heat exchanger is a miniaturized plate heat exchanger in which the single fluid streams are ducted in a way that the inlets as well as the outlets of both fluids are at the same direction of the device to each other and, therefore, the fluid streams are running in parallel which is described in EP 1 046 867.

An electrically powered parallel flow micro heat exchanger is a miniaturized heat exchanger where the heating or cooling energy is given by electrical elements (resistor heater cartridges, Peltier-Elements) such as described in e.g. EP 1 046 867, EP 1 402 589, EP 1 402 589.

The micro reactor suitable for the polycondensation of glucose is a micro channel device, possibly integrated with at least a membrane, porous sidewalls or micro separation nozzle elements. Alternatives solutions are provided by Kreido's micro reactor that possesses a moving part which in their case is the internal cylinder as is described in e.g. EP 1 866 066.

A micro channel device integrated with a membrane is in the range of 1 to 2000 μm wide, 1-2000 μm deep and in direct contact with the membrane, which forms at least one sidewall of the channel. The membrane can be a polymer, metal or ceramic membrane with pore sizes according to the process needs, ranging from some nanometer to the micrometer level.

Porous sidewalls have pores of the same specifications than the membranes or micro separation nozzle elements suitable for the desired process, preferably in the range of some nanometer up to 1 mm diameter.

The current invention relates to a process wherein the micro device is applied at sub-atmospheric pressure, atmospheric pressure or elevated pressure, in the range from very low pressures in the ultra-high vacuum range (almost 0 bar) to 1000 bar.

Furthermore it relates to a process wherein the composition and/or polydextrose are kept at a pressure allowing withdrawal of water at a pressure difference, namely to withdraw the water as steam or vapour into a vacuum.

Furthermore the current invention relates to a process wherein the polydextrose after leaving the micro device is quenched. Quenching might include the addition of adding water, with a base: caustic soda, potassium hydroxide but also amines; at elevated temperature in the range of 50 to 150° C. to ensure the polydextrose does not solidify or become too viscous in a micro-mixer, micro heat exchanger, a microstructure evaporator or a microstructure steam dryer.

A micro heat exchanger is a cross flow micro heat exchanger, counter-current flow micro heat exchanger, co-current flow micro heat exchanger or an electrically powered parallel flow micro heat exchanger and/or micro reactors suitable for the polycondensation of glucose, according to the definitions given above.

A microstructure evaporator is a micro heat exchanger suitable and/or specially designed for evaporation of liquids. Examples are given in e.g. EP 1 402 589.

A microstructure steam dryer is a microstructure evaporator according to the given explanation, used to dry a steam flow, e.g. to obtain crystallization of solid contents in the steam.

The current invention further relates to a process wherein a polyol (=sugar alcohol) is added in step a) and/or step b) of the process for preparing polydextrose.

The polyol (is sugar alcohol) is provided in solid form or liquid form and is selected from triitols, tetritols, pentitols, hexitols, hydrogenated disaccharides, hydrogenated trisaccharides, hydrogenated tetrasaccharides, hydrogenated maltodextrins and mixtures of two or more thereof.

More specifically, the polyol is selected from the group consisting of glycerol, erythritol, threitol, arabinitol, xylitol, ribitol, allitol, altritol, gulitol, galactitol, mannitol, sorbitol, talitol, maltitol, isomaltitol, isomalt, lactitol, and mixtures of two or more thereof.

In a preferred embodiment, the polyol is selected from the group consisting of maltitol, isomalt, mannitol, sorbitol, xylitol, erythritol and mixtures of one or more thereof. In a more preferred embodiment, the polyol is selected among the hexitols, most preferably sorbitol.

Preferably, the amount of sugar alcohols used in the starting material is from 0 to 20% by weight of glucose, more preferably from 1 to 15% by weight, most preferably from 5 to 15% by weight.

It further relates to a process wherein the composition is pre-mixed or mixed by integrated micro mixers to obtain a mass ratio of the reactants according to the desired process, preferably the glucose at a quantity between 50-weight-% and 90 weight-%, more preferably between 70 weight-% and 80 weight-%, the polyol at a quantity between 50-weight-% and 0 weight-%, more preferably between 30 weight-% and 0 weight-%, or between 20 weight % and 10 weight %, and the acidic catalyst between 10 weight-% and 0 weight-%, most preferably at 1 weight-%.

In one specific embodiment, the glucose and optionally the polyol (depending upon the fact whether polyol is actually added into the process) are provided in melted form. The glucose and polyol can be melted separately or together, starting from a solid form or a high dry substance aqueous solution where the water is first removed followed by heating the solution to obtain a melt of the glucose (and optionally polyol). These steps can already be performed in microreactors as well. The acidifying catalyst is added before the polycondensation reaction starts. The thus obtained polydextrose can be applied as such by cooling down the polydextrose and adding water for obtaining an aqueous solution of the polydextrose. Usually the polydextrose is provided in a dry matter content of 30 to 80%, preferably 50 to 70%. In a single pass through the microreactor, the polymerisation degree of the polydextrose is already significant. The degree of polymerisation is applied as in polymer chemistry and refers to the number of repeat units in the chain. The degree of polymerisation is a measure of molecular weight and the molecular weight of the monomer is calculated as about 162. The polymerisation degree of the polydextrose can be further increased by recycling of the polydextrose which dry matter content is increased (reduce the water content—water which is formed during the polycondensation reaction) before the recycle into the microreactor. Therefore the polydextrose is collected and the dry matter content of the collected polydextrose is increased by removing water and polydextrose is recycled to step c) and/or is injected through at least one other microdevice. Through this recycle the yield and/or the polymerisation degree of the polydextrose are increased.

The microreactor for the recycle might be the same as used before in the process or a set of multiple (at least two or more) microreactors can be applied.

In yet another embodiment the glucose and optionally the polyol (depending upon the fact whether polyol is actually added into the process) are provided as an aqueous solution having a dry matter content of 50 to 99%, preferably 70 to 99%, more preferably 80 to 95%.

By applying aqueous solutions easy handling is obtained and it is not necessary to start from the high pure or high crystalline materials or solidified forms. Aqueous solutions of less pure starting materials can be applied as well. After the drying optionally in a microreactor followed by polycondensation reaction in the microreactor, the polydextrose thus obtained is increased in dry matter content and is recycled into the microreactor for further increasing the polymerisation degree. The microreactor might be the same as used before in the process or a set of multiple (at least two or more) microreactors can be applied.

The temperature of the process is from 100° C. to 350° C., preferably from 150° C. to 250° C., more preferably from 180° C. to 200° C.

Before collecting the polydextrose, it can be cooled by using a micro heat exchanger.

Surprisingly, it was found that the microdevice is having a beneficial effect on the polycondensation of glucose while an acidifying catalyst (=acid) is present.

Furthermore it was found surprisingly that the polycondensation reaction is occurring at high temperatures such as from 150° C. to 250° C. without significant losses of product and significant formation of by-products.

In polycondensation reactions of glucose, and optionally with addition or in presence of the polyol, one is usually interested in obtaining a product of specific molecular weight or a range of products with specific molecular weights, since the properties of the polydextrose will usually be dependent on molecular weight. Molecular weights higher or lower than the desired weights are equally undesirable. Since the degree of polymerization is a function of reaction time, the desired molecular weight can be obtained by quenching the reaction at the appropriate time. It has been seen that by applying a microdevice the reaction time which usually takes at least 1 to 2 hours, even up to 6 hours, can be reduced to less than 30 minutes, even to a residence time of less than 5 minutes, even to a residence time of less than 2 minutes.

In a specific embodiment, the current invention relates to a process wherein glucose is applied, the acidifying catalyst is citric acid, the polyol is sorbitol and polydextrose is obtained. More specifically the current invention relates to a process for preparing polydextrose and said process is comprising the following steps:
  a. Taking glucose,
  b. Adding sorbitol and citric acid for preparing an acidic composition, potentially in a microdevice
  c. Injecting the composition through a microdevice
  d. Removing the formed water from the polydextrose,
  e. Optionally recycling the polydextrose in step c)
  f. Collecting the polydextrose.

The recycle of polydextrose in step c) continues until the desired degree of polymerisation is achieved.

Furthermore, formation of degradation products such as furans, furfural and 5-hydroxymethyl furfural (5HMF) is significantly reduced as well by applying microreactors.

The collected polydextrose can be used as is or may be further purified by chromatographical treatment or hydrogenation of residual reducing sugars (carbohydrates) that may have an effect on the taste and colour of the final product.

The current invention further relates to the use of microdevice for polycondensation reactions of glucose optionally in presence of polyols for the preparation of polydextrose.

Furthermore, the current invention relates to an arrangement of microdevices allowing a single-pass-through or a multi-pass-through of injected composition through the microdevice, a re-mix of the collected polydextrose with the initial composition for a multi-pass-through or a complete multi-pass-through for the composition.

Other arrangements might include: a) microdevice-evaporator-microdevice (same as first one or different) and b) several iterations of a) and c) microdevice-evaporator with recirculation into same microdevice.

The invention will hereunder be illustrated in the form of a series of examples.

EXAMPLES

Example 1

Supply is Melted Glucose

Crystalline anhydrous Dextrose (C*Dex02402) was melted at a temperature of 155° C. In parallel, solid Sorbitol (C*Sorbidex P16656) was melted at 120° C. and Citric acid was added at a weight ratio of 10:1 (Sorbitol/citric acid). The Dextrose melt was pumped to a micro mixer (V-Mischer 1013-K-8.3, KIT, IMVT) at a rate of 150 g/min and intensively mixed with the Sorbitol/citric acid blend which was also pumped to the micro mixer (V-Mischer 1013-K-8.3, KIT, IMVT) at a ratio of 10 parts Dextrose melt and 1 part Sorbitol/citric acid melt. This mixture was immediately conveyed to a micro heat exchanger (Kreuzströmer 678-K-1.3, KIT, IMVT) which raised the temperature of the reaction mass to 175° C. The residence time was about 90 seconds. Afterwards the reaction mass was cooled in micro heat exchanger (Kreuzströmer 678-K-1.3, KIT, IMVT) to 110° C. and mixed with water in a micro mixer (V-Mischer 1013-K-8.3, KIT, IMVT) to obtain a polydextrose solution at 50% (w/w) solids content. The HPLC analysis (ISO 10504:1998-10, Starch derivates—Determination of the composition of glucose syrups, fructose syrups and hydrogenated glucose syrups—Method using high-performance liquid chromatography) showed a polydextrose content of 49.8% (=the sum of the oligomers having degree of polymerisation 2 and higher).

Example 2

Supply is Aqueous Solution of Glucose

Crystalline anhydrous Dextrose (C*Dex02402) was blended with solid Sorbitol (C*Sorbidex P16656) and Citric acid at a weight ratio of 90:10:1. This dry blend was mixed with water at 80° C. to obtain a solution at 80% (w/w) solids content. The resulting solution was pumped at a rate of 20 ml/min to a micro heat exchanger (Kreuzstromreaktormodul 1694-X-19.0, KIT, IMVT) which brought the product temperature to 200° C. The polydextrose left the micro heat exchanger after a residence time of 70 seconds and was diluted with water to 50% (w/w) solids content. The HPLC analysis (ISO 10504:1998-10) showed a polydextrose content of 54.7% (=the sum of the oligomers having degree of polymerisation 2 and higher).

Example 3

Supply is Aqueous Solution of Glucose+Recycle of Polydextrose

Crystalline anhydrous Dextrose (C*Dex02402) was blended with solid Sorbitol (C*Sorbidex P16656) and Citric acid at a weight ratio of 90:10:1. This dry blend was mixed with water at 80° C. to obtain a solution at 80% (w/w) solids content. The resulting solution was pumped at a rate of 20 ml/min to a micro heat exchanger (Kreuzstromreaktormodul 1694-X-19.0, KIT, IMVT) which brought the product temperature to 200° C. The polycondensation product (=polydextrose) was leaving the micro heat exchanger after a residence time of 70 seconds and sprayed into a collection chamber. During that step the water was partly evaporating, thus increasing the dry matter content and the degree of polymerisation of polydextrose further. The reaction mass was conveyed to a second micro heat exchanger (Kreuzstromreaktormodul 1694-X-19.0, KIT, IMVT) where the product was heated again for 70 seconds at 200° C. Afterwards the polycondensation product (=polydextrose) was diluted with water to 50% (w/w) solids content. The HPLC analysis (ISO 10504: 1998-10) showed a polydextrose content of 80.0% (=the sum of the oligomers having degree of polymerisation 2 and higher) which is significantly higher than found in example 2.

The invention claimed is:

1. A process for preparing polydextrose, the process comprising: a) providing glucose; b) adding an acidifying catalyst to the glucose to provide an acidic composition; c) injecting the acidic composition through a microdevice that comprises at least one of a micro mixer, a micro heat exchanger, and a micro reactor suitable for use in the polycondensation of carbohydrates; and d) collecting polydextrose that is a randomly cross-linked polysaccharide complex having predominantly β-1-6 and β-1-4 linkage, wherein the glucose is provided as an aqueous solution having a dry matter content of 50 to 99%.

2. The process of claim 1, wherein the micro mixer is a kinetic micro mixer, a diffusion micro mixer, a cyclone-type micro mixer, a multi-lamination micro mixer, a focus micro mixer, or a split-and-recombine micro mixer.

3. The process of claim 1, wherein the micro heat exchanger is a cross flow micro heat exchanger, a counter-current flow micro heat exchanger, a co-current flow micro heat exchanger, or an electrically powered parallel flow micro heat exchanger.

4. The process of claim 1, wherein the micro reactor is a micro channel device integrated with a membrane, porous sidewalls, or micro separation nozzle elements.

5. The process of claim 1, wherein the process is carried out at atmospheric pressure or elevated pressure in the range of from 1 to 40 bar.

6. The process of claim 1, further comprising adding a polyol in step a) and/or step b).

7. The process of claim 6, wherein at least one of the glucose and the polyol is melted.

8. The process of claim 6, wherein the polyol comprises sorbitol.

9. The process of claim 6, wherein the acidifying catalyst comprises citric acid.

10. The process of claim 9, wherein the polyol comprises sorbitol.

11. The process of claim 1, wherein the glucose is melted.

12. The process of claim 1, wherein the dry matter content of the acidic composition is from 50 to 99%.

13. The process of claim 1, wherein the dry matter content of the collected polydextrose is increased by removing water and said polydextrose is recycled to step c) and/or is injected through at least one other microdevice.

14. The process of claim 1, wherein the acidic composition is pre-mixed or mixed by integrated micro mixers.

15. The process of claim 1, wherein the polydextrose, after leaving the microdevice, is quenched in a micro heat exchanger, a microstructure evaporator, or a microstructure steam dryer.

16. The process of claim 1, wherein the acidifying catalyst comprises citric acid.

17. The process of claim 1, wherein the glucose is provided as an aqueous solution having a dry matter content of 80 to 95%.

* * * * *